United States Patent
Feng et al.

(10) Patent No.: US 10,558,635 B2
(45) Date of Patent: Feb. 11, 2020

(54) TRAFFIC DATA STREAM AGGREGATE QUERY METHOD AND SYSTEM

(71) Applicant: Hohai University, Nanjing, Jiangsu (CN)

(72) Inventors: Jun Feng, Jiangsu (CN); Zhixian Tang, Jiangsu (CN); Zhonghua Zhu, Jiangsu (CN); Xianyue Zha, Jiangsu (CN); Bingshuai Du, Jiangsu (CN); Xiao Xu, Jiangsu (CN); Chao Wang, Jiangsu (CN); Yuelong Zhu, Jiangsu (CN); Shijin Li, Jiangsu (CN); Dingsheng Wan, Jiangsu (CN)

(73) Assignee: Hohai University, Nanjing, Jiangsu (CN)

( * ) Notice: Subject to any disclaimer, the term of this patent is extended or adjusted under 35 U.S.C. 154(b) by 350 days.

(21) Appl. No.: 15/328,090

(22) PCT Filed: Aug. 5, 2015

(86) PCT No.: PCT/CN2015/086130
§ 371 (c)(1),
(2) Date: Jan. 23, 2017

(87) PCT Pub. No.: WO2016/015683
PCT Pub. Date: Feb. 4, 2016

(65) Prior Publication Data
US 2017/0212894 A1      Jul. 27, 2017

(30) Foreign Application Priority Data

Aug. 1, 2014   (CN) .......................... 2014 1 0378094

(51) Int. Cl.
*G06F 16/00*        (2019.01)
*G06F 16/22*        (2019.01)
(Continued)

(52) U.S. Cl.
CPC ........ *G06F 16/2255* (2019.01); *G06F 16/244* (2019.01); *G06F 16/24568* (2019.01);
(Continued)

(58) Field of Classification Search
CPC .......... G06F 16/2255; G06F 16/24568; G06F 16/244; G06F 16/258; G06F 16/9535; G06F 16/29
(Continued)

(56) References Cited

U.S. PATENT DOCUMENTS

| 6,785,240 B1 * | 8/2004 | Cao ...................... H04L 43/045 370/238 |
| 2008/0054072 A1 * | 3/2008 | Katragadda ............ G08G 1/123 235/384 |

(Continued)

FOREIGN PATENT DOCUMENTS

| CN | 102568205 | 7/2012 |
| CN | 102629418 | 8/2012 |
| CN | 104156524 | 11/2014 |

OTHER PUBLICATIONS

International Search Report and Written Opinion of PCT/CN2015/086130 dated Nov. 3, 2015, 11 pages (English and Chinese).

(Continued)

*Primary Examiner* — Thanh-Ha Dang
(74) *Attorney, Agent, or Firm* — Rankin, Hill & Clark LLP (57) ABSTRACT

A traffic data stream aggregate query method and system includes the steps of acquiring spatial-temporal information of a mobile object to generate a traffic data stream, dividing data space into cells, grouping adjacent cells with similar frequency into few buckets, calculating Kalman gains of the buckets based on frequencies of the buckets, and indexing the buckets using a binary partition tree to form a BPT index (Continued)

of the current timestamp, and serializing the BPT after the end of the current timestamp to form a historical index; and performing aggregate query, wherein an optimum estimation value of the bucket frequency is utilized to replace for calculating when the frequency of the bucket changes a lot. The system includes: an information collection module, a data processing module, an index processing module, an application service module and an index storage module.

10 Claims, 4 Drawing Sheets

(51) Int. Cl.
*G06F 16/29* (2019.01)
*G06F 16/242* (2019.01)
*G06F 16/25* (2019.01)
*G06F 16/9535* (2019.01)
*G06F 16/2455* (2019.01)

(52) U.S. Cl.
CPC ............ *G06F 16/258* (2019.01); *G06F 16/29* (2019.01); *G06F 16/9535* (2019.01)

(58) Field of Classification Search
USPC .......................................................... 707/741
See application file for complete search history.

(56) References Cited

U.S. PATENT DOCUMENTS

| | | | |
|---|---|---|---|
| 2011/0231133 A1* | 9/2011 | O'Hare | ................. G01C 19/42 |
| | | | 702/92 |
| 2013/0151563 A1* | 6/2013 | Addepalli | ............... H04L 67/10 |
| | | | 707/792 |
| 2014/0176714 A1 | 6/2014 | Li et al. | |
| 2015/0248917 A1* | 9/2015 | Chang | ................ H04N 21/8549 |
| | | | 386/282 |

OTHER PUBLICATIONS

Feng et al.: "Research on Novel Method for Forecasting Aggregate Queries over Data Streams in Road Networks", Journal of Frontiers of Computer Science & Technology, vol. 4, No. 11, Nov. 30, 2010, pp. 1027-1038 (w/ English Abstract).

Feng et al.: "A new spatio-temporal prediction approach based on aggregate queries", International Journal of Knowledge and Web Intelligence, vol. 4, No. 1, Dec. 31, 2013, pp. 20-33.

* cited by examiner

TRAFFIC DATA STREAM AGGREGATE QUERY METHOD AND SYSTEM

TECHNICAL FIELD

The present invention relates to a traffic data stream aggregate query method and system, and belongs to the field of information technology processing.

BACKGROUND

With the rapid development of Internet of Things, social network and cloud computing technology, a large number of business applications have produced mass data, and data traffic has exponentially increased rapidly. The analysis and mining of these mass data to discover various laws and information contained in these data has become the research focus in the technical field of big data processing. The data includes static data and dynamic data. The dynamic data, also known as data stream, has the features of instantaneity, unlimitedness, temporality, velocity uncertainty and metadata infinity, etc. The traffic data stream is namely a typical dynamic data stream. For example, in order to analyze and control the traffic stream and relieve traffic pressure, a traffic monitoring system often pays close attention to the approximate summary information of moving vehicles on specific sections in a specific time period, for example, monitoring and analyzing the traffic volume during the rush hour of Xinjiekou in Nanjing City.

Traditional data query methods, such as skyline query, cannot be applied to dynamic data changes, and are ineffective for data stream queries. Therefore, it has developed an aggregate query method in the technical field of data query, which obtains statistical and summary information by scanning a large number of data tuples. However, due to the features of instantaneity, unlimitedness, temporality, velocity uncertainty and metadata infinity of the traffic data stream, it is difficult to perform aggregate query on the entire data set so as to obtain an accurate query result in a shorter time even with the cloud computing technology with parallel computing ability. Therefore, high-quality approximate aggregate query results are usually used to replace the accurate query results in practical applications. In the face of the gradually improved requirements of the industry on the query accuracy, a variety of approximate aggregate query methods are developed, such as sliding window technology, random sampling technology, wavelet technology, sketch index structure, histogram technology, etc. However, the advantages and disadvantages of an algorithm are measured by all the existing approximate aggregate query methods using an average query error, so that the accuracy of the existing approximate aggregate query method cannot effectively replace exact query.

Therefore, it is necessary to improve the existing aggregate query method and propose a new clustering query method to improve the accuracy of clustering query, so as to solve the technical problem that the existing approximate aggregate query method cannot effectively replace the traditional accurate query method, thereby effectively replacing the traditional accurate query method.

BRIEF DESCRIPTION

In view of the above-mentioned defects of the prior art, an object of the present invention is to provide an improved aggregate query method and system which utilizes a Kalman filter principle to obtain a posteriori estimation by correcting a priori state estimation, utilizes a frequency of a bucket to optimally estimate an aggregate value of an abnormal point, and proposes that the technical problem to be solved by the present invention is to ignore the defect that the maximum relative error can be generated for the existing approximate aggregate query technology.

The present invention provides a traffic data stream aggregate query method, including the following steps of:

step 1: collecting mobile object information, and converting the mobile object information into a computer-processible data form to form a data stream when a system timestamp arrives;

step 2: generating and updating an index file when the system timestamp arrives; and step 3: performing traffic data stream query on a spatial region r according to a query request SUM(r,ts,te) of a user while generating and updating the index file, extracting a system timestamp of a query time interval [ts,te], and performing spatial aggregate query on each timestamp: traversing an index file of the current timestamp, and obtaining aggregate query values of the spatial region in each bucket under the current timestamp using a following expression:

$$SUM = \begin{cases} f_{bi} \square S_{intr} \square \omega^2, & v_{bi} \leq (f_{bi} - f_{bi}^-)^2 \\ [f_{bi}^- + Kg_{bi}(f_{bi} - f_{bi}^-)] \square S_{intr} \square \omega^2, & v_{bi} > (f_{bi} - f_{bi}^-)^2 \end{cases}$$

SUM being an aggregate query value of the spatial region r at a $(bi)^{th}$ bucket, $S_{intr}$ being an area of an interacted region of the spatial region r and the $(bi)^{th}$ bucket, $f_{bi}$ being an average frequency of the $(bi)^{th}$ bucket at the current timestamp, $f_{bi}^-$ being an average frequency of $(bi)^{th}$ bucket at a previous timestamp $t^-$, and $v_{bi}$ being a variance of the $(bi)^{th}$ bucket, summing the query values of each timestamp to form a final aggregate query value.

Further, step 2 includes:

step A: initializing an index file generated by a data stream of a first system timestamp: adopting a reasonable histogram to divide data space into $\omega \square \omega$ cells, using a mobile object number within the cell in the current timestamp as a frequency of the cell, then grouping the adjacent cells with similar frequency into one bucket, and forming n buckets, $0 < n \leq B$, $\omega$ being a $\omega$, and B being an upper limit of the bucket number, for each bucket: using the average frequency of all the cells in the bucket as a frequency of the bucket to calculate an average value of the of an average frequency variance of each cell in the bucket, and a variance and a Kalman gain of the bucket;

step B: using a Kalman filtering principle to update the index file when a next system timestamp arrives:

step B-1: when data in a $c^{th}$ cell changes, recording a data variance as d, and updating a frequency $F_c$ of the $c^{th}$ cell: $F_c^- = F_c$, $F_c = F_c + d$, wherein: $F_c^-$ is a frequency of the $c^{th}$ cell in a previous timestamp, $1 \leq c \leq \omega^2$, and d is any real number;

step B-2: traversing the index file of the current timestamp to find buckets containing the cells with changed data volumes, for a $b^{th}$ bucket, the $b^{th}$ bucket containing $n_b$ cells, $b < n$, and $n_b < \omega \square \omega$:

updating a frequency of the $b^{th}$ bucket: $f_b = f_b^- + d$, $\Delta g = f_b^2 - f_b^{-2}$, updating an average value and a variance of per square of frequency of each cell in the $b^{th}$ bucket: $g_b = (n_b \cdot g_b^- + \Delta g)/n_b$, $v_b = g_b - f_b^2$, updating a Kalman gain of an $i^{th}$ cell in the $b^{th}$ bucket, $F_i$ being a frequency of the $i^{th}$ cell:

when $F_i > f_b$, the Kalman gain of the $i^{th}$ cell being:

$$Kg_i^+ = \frac{f_b + \sqrt{v_b} - f_b^-}{f_b - f_b^-},$$

when $F_i \leq f_b$, the Kalman gain of the $i^{th}$ cell being:

$$Kg_i^- = \frac{f_b - \sqrt{v_b} - f_b^-}{f_b - f_b^-},$$

calculating out the number $n_{b1}$ of cells with a frequency greater than the average frequency in the $b^{th}$ bucket, and updating the Kalman gain of the $b^{th}$ bucket: $Kg_b = n_{b1} \square Kg_i^+ + (n_b - n_{b1}) \square Kg_i^-$, and $1 \leq i \leq n_{b1} \leq n_b$;

step B-3-A: for buckets needing to be split, calculating a best split profit and an optimum division position of each bucket needing to be split, dividing the bucket needing to be split into two sub-buckets and setting both frequencies of the two sub-buckets in the previous system timestamp be equal to that of the bucket before splitting, then repeating step B-1;

step B-3-B: for buckets not needing to be split, using a minimum merge penalty principle to merge a plurality of buckets with concentrated frequencies into one bucket when the bucket number in the index reaches an upper limit, and then repeating step B-1;

step B-3-C: for buckets not needing to be split, returning step 1 when the bucket number in the index does not reach the upper limit and the current system timestamp is not ended; and step B-3-D: for buckets not needing to be split, extracting an index file of the current timestamp to generate a historical index when the bucket number in the index does not reach the upper limit and the current system timestamp is ended.

Further, a binary partition tree structure is adopted in step 2 to index buckets.

Further, a greedy algorithm is utilized in step B-3-A to calculate a best split profit and an optimum division position of each bucket needing to be split.

Further, the historical index generated in step 2 is serialized and stored in an index storage module.

Further, the mobile object information collected in step 1 includes numbering, longitude and latitude coordinates.

The present invention also provides a traffic data stream aggregate query system, including: an information collection module, configured to collect mobile object information, and convert the mobile object information into a computer-processable data form to form a data stream when a system timestamp arrives and send the data stream to a data processing engine; a data processing module, configured to divide spatial data in the system timestamp into cells, group adjacent cells with closer mobile object number into a bucket, generate an index file of the bucket, calculate a freq of the bucket, an average value of an average frequency variance, a variance and Kalman gain of each cell, and use a Kalman filtering principle to update the index file when a new system timestamp arrives; an index storage module, configured to store an index file generated by an index generating and updating module; and an application service module, configured to invoke the index storage module to look up an index file complying with a query request, and feedback a clustering query value.

Further, the processing module is configured to receive an index of the current timestamp, serialize and output the index of the current timestamp and the historical index to the storage module after the ending of the current timestamp.

The present invention also provides a traffic stream index creation method based on Kalman filtering, including step A: acquiring and preprocessing, by an information collection module, mobile object information; step B: judging, by a data processing module, whether a BPT index of the current timestamp exists in an index storage module, skipping to step B if the BPT index exists; else, skipping to step C; step C: creating a new BPT index of the current timestamp, wherein: both Kg and $f^-$ are 0, then skipping to step D; step D: updating the BPT index based on the Kalman filtering principle; step E: judging whether a bucket in the BPT index needs to be split according to a variance of the bucket, splitting is needed if the variance of the bucket is greater than a preset threshold, then skipping to step F; else, skipping to step G; step F: calculating a split benefit SB of each splitting situation in each bucket needing to be split b and a corresponding division position by exhaustive enumeration, recording a cell number and a variance of b before splitting as $n_b$ and $v_b$, and dividing b into $b_1$ and $b_2$, wherein: the corresponding cells and variances are respectively: $n_{b1}$, $n_{b2}$ and $v_{b1}$, $v_{b2}$, then the split benefit $SB = n_b \square v_b - (n_{b1} \square v_{b1} + n_{b2} \square v_{b2})$, the one having the maximum SB value being recorded as the best split profit (BSP), dividing the bucket b into two sub-buckets b1 and b2 according to the BSP, and setting an initial value of $f_{b1}^- = f_{b2}^- = f_b^-$ after splitting, returning to step D, updating the BPT index, and calculating a corresponding Kalman gain; step G: judging whether a bucket number in the index reaches a maximum upper limit (B) of the bucket number set by the system, skipping to step h if yes; else, skipping to step I; step H: merging the buckets in the index, and calculating out merge penalty MP of all possibly merged buckets, wherein: the bucket in the BPT needs to be a none-leaf node, and two child nodes thereof are both leaf nodes, then selecting and merging a plurality of buckets with minimum merge penalty into one bucket; a calculation rule of the merge penalty being similar to the split benefit, which is to use the cell number of the bucket formed after merging to multiply by the variance, and then subtract the sum of the products of the cell numbers and variances of the two buckets before merging, then a merge penalty calculation formula being: $MP = n_b \square v_b - (n_{b1} \square v_{b1} + n_{b2} \square v_{b2})$, and using the method of step D to update the BPT index; step I: judging whether the current timestamp is ended, skipping to step J if the current timestamp is ended; else, skipping to step A; and step J: extracting, by an index processing module, the BPT index of the current timestamp from the index storage module, generating a historical index, serializing and storing the historical index into the index storage module.

Further, step A further includes: step A-1: acquiring, by the information collection module, a mobile object signal, and converting the signal into a data stream form; and step A-2: sending, by the information collection module, to the data processing module when one system timestamp arrives.

Further, step D further includes: step D-1, for each changed cell c, calculating a variance d thereof and updating frequency information thereof: $F_c^- = F_c$, $F_c = F_c + d$ ($F_c^-$ representing a frequency of a previous timestamp); step D-2: for each changed cell c, traversing the BPT index to find a bucket b containing the changed cell, and updating a frequency and a Kalman gain of the bucket b: $f_b^- = f_b$, $f_b = f_b + d$, $\Delta g = f_b^2 - f_b^{-2}$, and $g_b = (n_b \cdot g_b + \Delta g)/n_b$, $v_b = g_b - f_b^2$; and step D-3: finding out a number of cells having a frequency greater than the mean frequency in the bucket, and calculating a Kalman gain of the bucket: $Kg_b = n_{b1} \Box Kg^+ + (n_b - n_{b1}) \Box Kg^-$.

The present invention also provides a traffic stream aggregate query method based on Kalman filtering, including step A: parsing a query request Q(r,ts,te) of a user, extracting a system timestamp set $\{t_1, t_2, \ldots, t_k | t_s \leq t_1 < t_2 < \ldots < t_k \leq t_e\}$ of a query time interval [ts,te], and placing the timestamps in the set into a stack T; wherein: r represents a query region, is represents a starting time, and to represents an ending time; and t1 . . . tk represent 1-K timestamps between the starting time and the ending time; step B: setting an aggregate query value AR=0; step C: for each timestamp in T, performing aggregate query, wherein: with respect to the spatial aggregate query of a single timestamp, for each bucket b intersected with a query region r: firstly, calculating an area $S_{intr}$ of an intersected region of the bucket b and the query region r; then, calculating intermediate results $f_b \cdot S_{intr} \cdot \omega^2$ of the bucket b; and finally, accumulating all the intermediate results to obtain a spatial aggregate query value of the single timestamp, query results of a plurality of timestamps being an accumulation of the query result of the single timestamp; and step D: returning the aggregate query value AR, and ending query.

Further, step C includes: step C-1: traversing the BPT to find all buckets b intersected with the query region r in space, calculating the intersected area Sintr of r and the buckets b, and placing the buckets into a stack S by means of <b, Sintr>; and step C-2: for each bucket in S, calculating an aggregate value thereof; if the bucket b satisfies conditions: $v_b \leq (f_b - f_b^-)^2$, then $AR += f_b \cdot S_{intr} \cdot \omega^2$ wherein: $\omega$ is a resolution, and $\omega^2$ is a square of the resolution, else, $AR += [f_b^- + Kg_b(f_b - f_b^-)] \cdot S_{intr} \cdot \omega^2$.

By employing the foregoing technical solution, the present invention has the following advantageous effects of: solving the defects that the existing data stream aggregate query methods overlook the maximum relative error, and improving the query accuracy and the availability of the method.

DETAILED DESCRIPTION

To make those skilled in the art better understand the technical solutions of the present invention, the present invention is further described in details hereinafter with reference to the drawings and specific embodiments. The embodiments of the present invention will be described in details hereinafter, examples of which are illustrated in the accompanying drawings, wherein same or similar reference numerals refer to same or similar elements, components and modules or elements, components and modules having the same or similar functions throughout. The embodiments described below with reference to the accompanying drawings are exemplary and are for explanation of the present invention only, and are not to be construed as limiting the present invention.

Those skilled in the art can understand that the singular forms "a", "an" and "the" as used herein, are intended to include the plural forms as well, unless expressly stated else. It will be further understood that the terms "includes", "comprises", "including" and/or "comprising" when used in this specification, specify the presence of stated features, integers, steps, operations, elements, components and/or modules, but do not preclude the presence or addition of one or more other features, integers, steps, operations, elements, components, modules and/or groups thereof. As used herein, the term "and/or" includes any and all combinations of one or more of the associated listed items.

Those skilled in the art can understand that, unless else define, all terms (technical and scientific terms) used herein have the same meaning as commonly understood those having ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As described below, the present invention creatively finds that the availability of the aggregate query method is determined by the maximum relative error through theoretical deduction and a large number of experiments; however, all the existing approximate aggregate query methods measure the advantage and disadvantages using an average query error, but overlook the influences of abnormal points that can produce maximum relative error or larger relative error on the performance or suitability of the aggregate query method. In view of this situation, the present invention firstly proposes to improve the existing aggregate query method using a Kalman filter principle, and obtain a posterior estimation method by correcting a priori state estimation and calculating aggregate values of the abnormal points by a frequency optimal estimation of the bucket, which effectively suppresses the maximum relative error of the anomaly points and provide reliable guarantee for the availability of the aggregate query methods. Preferably, the present invention uses traffic data as an application scenario, so that the present invention applies an improved clustering query method to traffic streaming data query and analysis.

Figure 1:
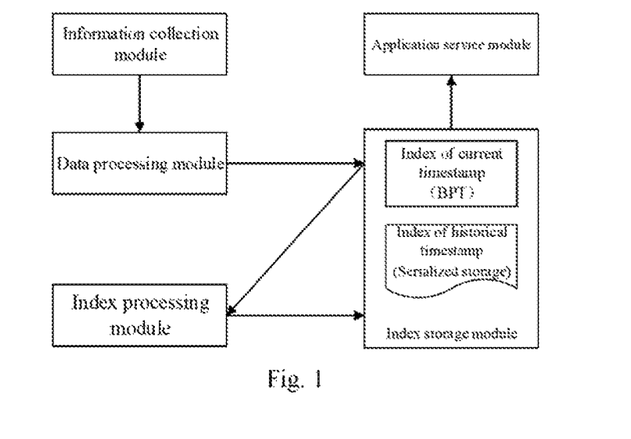
FIG. 1 is a structural schematic diagram of a traffic data stream aggregate query system according to an embodiment of the present invention.

FIG. 1 is a structural schematic diagram of a traffic data stream aggregate query system based on Kalman filtering. As shown in FIG. 1, the present invention provides a traffic data stream aggregate query system, which may include: an information collection module, a data processing module, an index processing module, an application service module and an index storage module.

The information collection module is configured to receive various mobile object signals including an object numbering OID, location information LOC and a time t, and send the received mobile object signals to the data processing module.

The data processing module is configured to encode and convert the received signals into a data form that can be processed by a data processing engine. When the encoded data reaches a system timestamp, the encoded data is sent to an information processing engine in a data stream form.

The data processing engine is configured to perform index processing on the received data stream, and may include an index processing module and an index storage module. An index may include a current index and a historical index, wherein the current index refers to an index in a current system timestamp, and the historical index refers to an index having a timestamp less than the current system timestamp; in order to improve the retrieval efficiency and storage efficiency, the system uses the index processing module to serialize the current index to generate the historical index. If there is no index of the current timestamp in the index storage module, a new index file is created; if the index of the current timestamp already exists, the index file is updated based on the received data stream. When the system timestamp ends, the index storage module outputs the index to the index processing module. The index processing module is configured to receive the current index, serialize the current index to generate a historical index, and then stores the index in the index storage module. The index storage module is configured to store the index of the entire system, including the current index and the historical index (serialized storage). After the current timestamp ends, the index storage module outputs the current time index (BPT) to the index processing module. When there is any query request, the index storage module outputs all the index to the application service module.

The application service module is configured to receive a query request of a user, performs aggregate query on the index in the index storage module, and generates an aggregate query result.

Since the mobile object information is a data stream with temporal and spatial attributes, the system discretizes the time of the index into a series of equally spaced time points for the convenience of processing. Two consecutive time points form a left-open right-closed interval. For mobile objects with time in the interval, the timestamps thereof are all represented by the time points at the right end of the interval.

Figure 2:
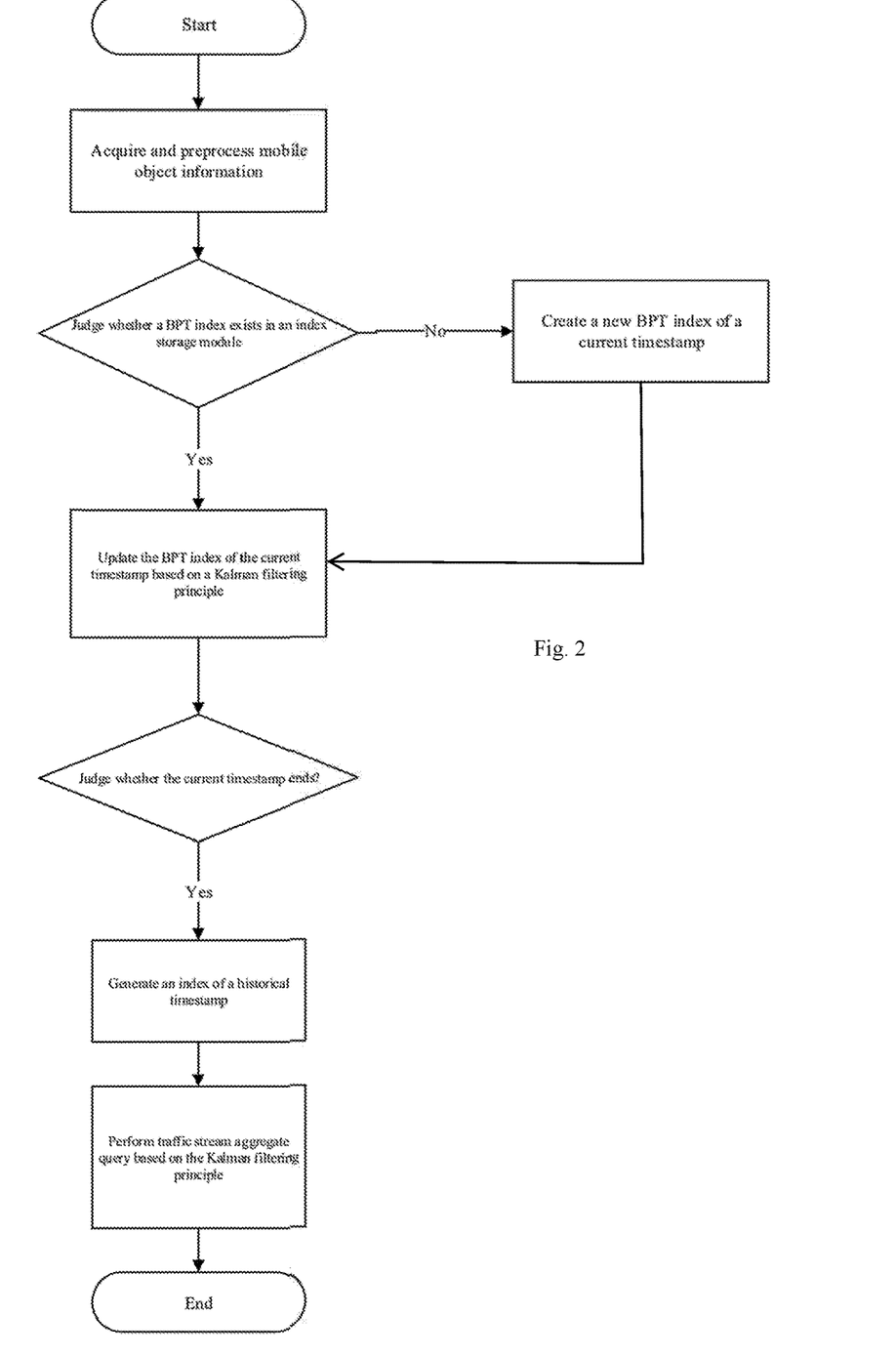
FIG. 2 is a flow schematic diagram of a traffic data stream aggregate query method according to an embodiment of the present invention.

FIG. 2 is a flow schematic diagram of a traffic data stream aggregate query method based on Kalman filtering. As shown in FIG. 2, according to the traffic data stream aggregate query system provided by the present invention, the traffic data stream aggregate query method provided by the present invention may include: firstly, acquiring and preprocessing mobile object information; next, judging whether a BPT index exists in an index storage module; if judging that the BPT index exists in the index storage module, then updating the BPT index of the current timestamp based on a Kalman filtering principle; if judging that the BPT index does not exist in the index storage module, then creating a new BPT index of the current timestamp, and updating the BPT index of the current timestamp based on the Kalman filtering principle subsequently; next, judging whether the current timestamp ends after the BPT index of the current timestamp is updated; if judging that the current timestamp ends, then generating a historical timestamp index; if judging that the current timestamp does not end, then returning the step of acquiring and preprocessing the mobile object information; next, performing traffic stream aggregate query based on the Kalman filtering principle after the historical timestamp index is generated.

As an embodiment, summing aggregate query may be adopted in the aggregate query method provided by the present invention, wherein: t represents a timestamp (timestamp), and r represents a query region. The return value of the aggregate query SUM(r,t) is total objects included in the query region r at the moment t. If t=0, it represents one query of the current timestamp; if t<0, it represents the query of the historical timestamp in the past.

Figure 3:
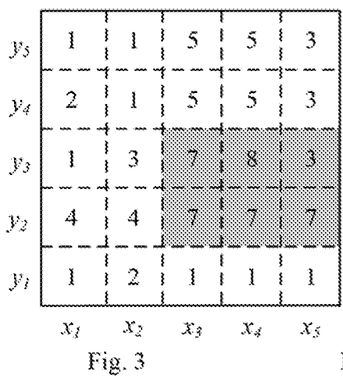
FIG. 3 is a data distribution schematic diagram of a two-dimensional traffic network at a timestamp 0 in the aggregate query method according to an embodiment of the present invention.
Figure 4:
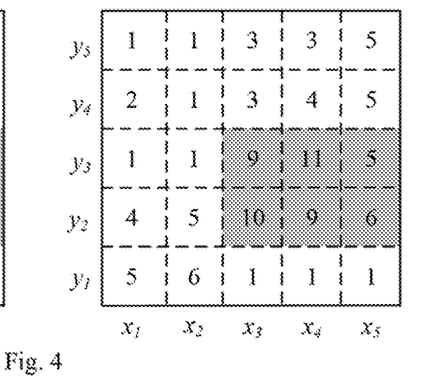
FIG. 4 is a data distribution schematic diagram of the two-dimensional traffic network at a timestamp 1 in the aggregate query method according to an embodiment of the present invention.

FIG. 3 and FIG. 4 are data distribution schematic diagram of a two-dimensional traffic network at a timestamp 0 and a timestamp 1 in the aggregate query method according to an embodiment of the present invention. As shown in FIG. 3 and FIG. 4, the entire data space is divided into 5□5 cell grids, the data of the timestamp 0 is distributed in a dark region in FIG. 3, and the data of the timestamp 1 is distributed in a dark region in FIG. 4. Let $q_r$ be represented as an area of a shadow part in the figure; if the current timestamp is 1, then the value of SUM (r, 0) is 50, i.e., the sum (9+11+5+10+9+6=50) of the numerals displayed in the shadow part, then the value of SUM (r,−1) is 7+8+3+7+7+3=35. If an aggregate value SUM (r,ts,te) of a time period needs to be queried, it only needs to extract corresponding timestamps from the time period [ts,te], perform the foregoing aggregate query on these timestamps respectively, and sum the query results, for example, the value of SUM(r,−1, 0) is 50+35=85.

Figure 5:
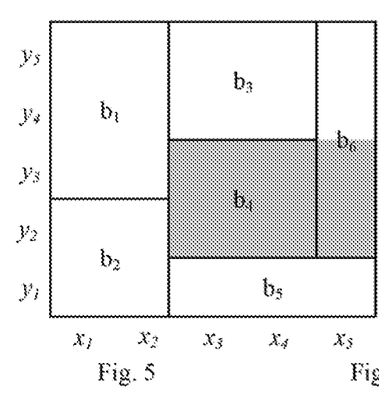
FIG. 5 is a schematic diagram of dividing a bucket in an RH structure in the aggregate query method according to an embodiment of the present invention.

FIG. 5 is a schematic diagram of dividing a bucket in an RH structure in the aggregate query method according to an embodiment of the present invention. FIG. 5 is a schematic diagram of a reasonable histogram RH (Reasonable Histogram) of the present invention. RH divides the data space into ω□ω (ω is "resolution") cells through two-dimensional grids, wherein each cell $c(1 \le c \le \omega^2)$ is corresponding to one frequency $F_c$, i.e., the frequency $F_c$ is the number of mobile objects in the cell c of the current timestamp.

Figure 6:
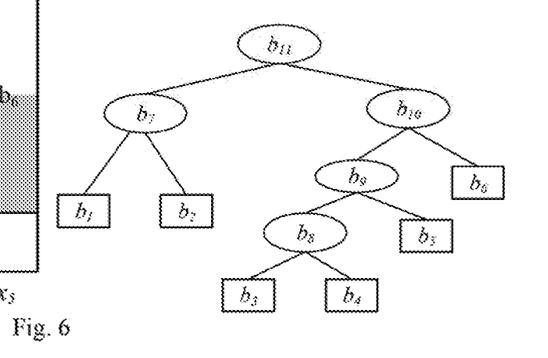
FIG. 6 is a schematic diagram of an BPT in the RH structure in the aggregate query method according to an embodiment of the present invention.

FIG. 6 is a schematic diagram of an BPT in the RH structure in the aggregate query method according to an embodiment of the present invention. As shown in FIG. 6, the RH groups adjacent cells with similar frequency into one bucket, and adopts a binary partition tree BPT (Binary Partition Tree) to index the bucket. As shown in FIG. 6, the BPT has one leaf node only initially, and the histogram only has a bucket that covers the entire data space, wherein a new bucket (leaf node) is produced through bucket splitting, but the number (n) of the bucket cannot exceed an upper limit (recorded as B) given by the system. As shown in FIG. 6: for each bucket b, a rectangle range RE of the bucket, an average frequency $f_b$ (recorded as the frequency of the bucket) of all the cells in the bucket, an average value $g_b$ of per square of frequency of the cells in the bucket, a variance $v_b$ and a Kalman gain $Kg_b$ of the bucket need to be stored.

For each bucket b of RH, $n_b$ represents a cell number in the bucket, then there is:

the average frequency (average value) of the cell:

$$f_b = (1/n_b) \sum_{\forall c \, in \, b} F_c \quad (1)$$

the variance (variance) of the bucket:

$$v_b = (1/n) \sum_{\forall c \, in \, b} (F_c - f_b)^2 \quad (2)$$

the target of RH is minimum variance sum (Weighted Variance Sum, WVS) of all the buckets.

$$WVS = \sum_{i=1 \sim n} (n_i v_i) \quad (3)$$

The information of b needs to be stored includes: the rectangle range RE of the bucket, the average frequency $f_b$ of all the cells in RE, and the average value of per square of frequency of the cells.

$$g_b = (1/n) \sum_{\forall c \, in \, RE} F_c^2 \quad (4)$$

Therefore, a process of querying RH is just to traverse BPT to find out each bucket intersected with the query region, calculate out an intersected area $S_{intr}$, then calculate out a cell number $S_{intr} \Box \omega^2$ covered by the intersected area of the bucket and the query region, then a summed aggregate query value is:

$$SUM = f_b \Box S_{intr} \Box \omega^2 \quad (5)$$

It can be found by analyzing formula (5) that if the formula (5) is directly adopted to calculate the aggregate value of the bucket, and utilize the average frequency f of the bucket to replace $F_c$, when the variance of the bucket is larger, a larger relative error will be formed, which affects the availability of the aggregate query method. Therefore, a Kalman filtering method is utilized in the present invention to optimize the aggregate query value, and the optimal estimation of the frequency of the bucket is utilized to replace the current average frequency f of the bucket. A specific method is as follows:

applying a state estimation equation of a Kalman filter to RH, then the optimal estimation value $\hat{f}_b$ of the frequency of the bucket at the current moment is:

$$\hat{f}_b = [f_b^- + Kg_b(f_b - f_b^-)] \quad (6)$$

Wherein, $f_b^-$ represents the average frequency of the bucket at a previous moment, $f_b$ represents the average frequency of the bucket at the current moment, and $Kg_b$ is the Kalman gain of the bucket. It should be noted that a sign $Kg_b$ is used herein to represent the Kalman gain of the bucket in the present invention, and a sign Kg will be used hereinafter to represent the Kalman gain of a cell c in the bucket of the present invention.

The current frequency of the bucket is replaced by $\hat{f}_b$, so as to suppress the maximum relative error of aggregate query of the abnormal point, then the formula (5) is changed as:

$$SUM_{intr} = [f_b^- + Kg_b(f_b - f_b^-)] \Box S_{intr} \Box \omega^2 \quad (7)$$

It can be known from the Kalman filter principle that the Kalman gain can be obtained through covariance matrix calculation of the system (formula (8)), P and R are covariance matrixes, i.e., P≥0, R≥0, and $Kg_b$≥0.

$$Kg = P^-(P^- + R)^{-1} \quad (8)$$

By analyzing formula (6), when $f_b \neq f_b^-$, it can be obtained that:

$$Kg_b = \frac{\hat{f}_b - f_b^-}{f_b - f_b^-} \quad (9)$$

For the bucket b in RH, the variance $v_b$ thereof can be defined as:

$$v_b = \frac{1}{n} \sum_{\forall c \, in \, b} (F_c - f_b)^2 \quad (10)$$

Because the error of formula (5) adopted is from a difference between $F_c$ and $f_b$, when $f_b$ is utilized to replace $F_c$ to perform aggregate query, in order to effectively suppress the maximum relative error, all the cells in the bucket need to have the same variance, and the formula (10) may be converted as:

$$v_b = (1/n) \Box n \Box (f_b - \bar{f}_b)^2 = (f_b - \bar{f}_b)^2 \quad (11)$$

In this way, $\bar{f}_b$ is closer to $F_c$ relative to $f_b$, and the $\bar{f}_b$ herein is corresponding to $\hat{f}_b$ in the formula (9), therefore:

$$\hat{f}_b = f_b \pm \sqrt{v_b} \quad (12)$$

by substituting the formula (12) into the formula (9), it can be obtained:

$$Kg_b = \frac{f_b \pm \sqrt{v_b} - f_b^-}{f_b - f_b^-} \geq 0 \quad (13)$$

By analyzing the formula (13), it can be obtained:

$$v_b (f_b - f_b^-)^2 \quad (14)$$

if $f_b - f_b^- = 0$, then the Kalman gain is not needed to be calculated, and the formula (5) is directly used for calculation.

It is proved as follows:
1) when $f_b - f_b^- > 0$,
since $$\frac{f_b \pm \sqrt{v_b} - f_b^-}{f_b - f_b^-} \geq 0,$$

then $f_b \pm \sqrt{v_b} - f_b^- \geq 0$
$\pm \sqrt{v_b} \leq f_b - f_b^-$ holds, i.e., $v_b \leq (f_b - f_b^-)^2$.
2) when $f_b - f_b^- < 0$
since $$\frac{f_b \pm \sqrt{v_b} - f_b^-}{f_b - f_b^-} \geq 0,$$

then $f_b \pm \sqrt{v_b} - f_b^- < 0$, $\pm \sqrt{v_b} \leq f_b^- - f_b$ holds, i.e., $v_b \leq (f_b - f_b^-)^2$.

In conclusion, $v_b \leq (f_b - f_b^-)^2$.

When a certain bucket in RH does not satisfy the formula (14), it indicates that the variance of the bucket is very big, and there is a great probability to produce a huge error, optimal estimation processing needs to be performed through a Kalman filtering method, and the error needs to be suppressed by replacing $f_b$ with $\hat{f}_b$, and the aggregate query value of the bucket at this moment shall be calculated using the formula (7); when the bucket satisfy the formula (14), it indicates that the variance of the bucket is not big, and the formula (5) is directly used; therefore, for a specific bucket, the aggregate query value can be defined as:

$$SUM = \begin{cases} f_b S_{intr} \omega^2 & v_b \leq (f_b - f_b^-)^2 \\ [f_b^- + Kg_b(f_b - f_b^-)]S_{intr}\omega^2 & v_b > (f_b - f_b^-)^2 \end{cases} \quad (15)$$

The average frequency (f) and variance (v) of each bucket as well as the mobile object data ($F_c$) and Kg of each cell are stored in a BPT index, and an aggregate value calculation formula of RH is given in the formula (15); therefore, the Kalman gains of the cell and the bucket in RH also need to be calculated. By analyzing the formula (13), it can be obtained that the two values of Kg are respectively recorded as:

$$Kg^+ = (f + \sqrt{v} - f^{-1})/(f - f^{-1}) \quad (16)$$

$$Kg^- = (f - \sqrt{v} - f^{-1})/(f - f^{-1}) \quad (17)$$

The values of Kg are continuously analyzed hereunder, and the target of RH is to make $\hat{f}^+$ closer to $F_c$ as far as possible; in this way, a minimum error can be ensured only; for each cell in the bucket:

when $F_c > f$, $\hat{f}^+$ is more closer to $f + \sqrt{v}$, then the Kalman gain of the cell is $Kg^+$; and when $f_c \geq f$, $\hat{f}^+$ is more closer to $f - \sqrt{v}$, then the Kalman gain of the cell is $Kg^-$.

It is given that the cell number with a frequency in one bucket greater than an average frequency of the bucket is $n_{b1}$, then a Kalman gain of the bucket is:

$$Kg_b = n_{b1} \square Kg^+ + (n_b - n_{b1}) \square Kg^- \quad (18)$$

FIG. 2 shows a traffic stream aggregate query method based on Kalman filtering, an index creation process of which includes the following steps.

In step A: mobile object information is acquired and preprocessed, which specifically includes the following steps.

In step A-1: the information collection module acquires a mobile object signal, and converts the signal into a data stream form.

In step A-2: the information collection module sends a mobile object data stream to the data processing module when one system timestamp arrives.

In step B, a data processing module judges whether a BPT index of the current timestamp exists in an index storage module, then skip to step B if the BPT index exists; else, skip to step C.

In step C, a new BPT index of the current timestamp (both Kg and f⁻ are 0) is created, and then skip to step D.

In step D: the BPT index is updated based on the Kalman filtering principle, for example, the step shown in the algorithm 1 in the table below.

In step D-1: for each changed cell c, a variance d thereof is calculated and frequency information thereof is updated: $F_c^- = F_c$, $F_c = F_c + d$ ($F_c^-$ representing a frequency of a previous timestamp).

In step D-2: for each changed cell c, the BPT index is traversed to find a bucket b containing the changed cell, and a frequency and a Kalman gain of the bucket b are updated: $f_b^- = f_b$, $f_b = f_b + d$, $\Delta g = f_b^2 - f_b^{-2}$, and $g_b = (n_b \cdot g_b + \Delta g)/n_b$, $v_b = g_b - f_b^2$.

In step D-3: a number $n_{b1}$ of cells having a frequency greater than the mean frequency in the bucket is found out, and a Kalman gain of the bucket is calculated: $Kg_b = n_{b1} \square Kg^+ + (n_b - n_{b1}) \square Kg^-$;

Algorithm 1 Bucket Update Algorithm

---

Algorithm 1 Update( )

1. Find the changed cell c; (d is a variance of the cell c)
2. $F_c^- = F_c$, $F_c = F_c + d$;
3. Place the cell c in a stack $S_c$, wherein a data format I <cell c, variance d>;
4. While ($S_c$ is not null){
5. $c_s = S_c$.pop( );
6. Traverse an index BPT to find out a bucket b containing a cell $c_s$;
7. $f_b^- = f_b$, $f_b = f_b + d$, $\Delta g = f_b^2 - fb^{-2}$;
8. $g_b = (n_b g_b + \Delta g)/n_b$, $v_b = g_b - f_b^2$;
9. Add the bucket b into a Hash table H;}
10. While(H.hasNext( )){
11. b = H .next( );
12. Find out a number of cells in b having a frequency greater than the average frequency (recorded as $n_b$);
13. Calculate the Kalman gain of b: $Kg_b = n_{b1} \square Kg^+ + (n_b - n_{b1}) \square Kg^-$;}
14. Return;
End Algorithm 1 Update( )

---

Wherein: The pop( ) method is used for deleting and returning last element of an array; in particular, the pop( ) method will delete the last element of arrayObject, subtract 1 from an array length, and return a value of the element deleted thereof; if the array is already null, then the pop( ) does not change the array, and returns an undefined value. The hasNext( ) method is used for returning whether the array has next element; if yes, then TRUE is returned; else, FALSE is returned.

In step E: whether a bucket in the BPT index needs to be split is judged according to a variance of the bucket, splitting is needed if the variance of the bucket is greater than a preset threshold, then skip to step F; else, skip to step G.

In step F, a split benefit SB of each splitting situation in each bucket b needing to be split and a corresponding division position are calculated by exhaustive enumeration, a cell number and a variance of b before splitting are recorded as $n_b$ and $v_b$, and b is divided into $b_1$ and $b_2$ (the corresponding cells and variances are respectively: $n_{b1}$, $n_{b2}$ and $v_{b1}$, $v_{b2}$) then the split benefit $SB = n_b \square v_b - (n_{b1} \square v_{b1} + n_{b2} \square v_{b2})$, and the one having the maximum SB value is recorded as the best split profit (BSP).

The bucket b is divided into two sub-buckets b1 and b2 according to the BSP, and an initial value of $f_{b1}^- = f_{b2}^- = f_b^-$ is set after splitting, the method in step D is utilized to update the BPT index (i.e., returning step D to process), and a corresponding Kalman gain is calculated.

The bucket split is just to split the region of the bucket with a big variance, which can improve the query precision of RH, and a specific processing step is as shown in the algorithm 2 in the table below:

Algorithm 2 Barrel Split Algorithm

Algorithm2 Split( )

1. Traverse BPT, and calculate a best split profit and an optimum division position of each bucket;
2. Put the best split profit, the optimum division position and corresponding bucket calculated into a set SM through a function SortedMap( ), wherein a data format is <best split profit, and object including the optimum division position and the information of the corresponding bucket>;
3. While (no new data or query arrives, and the number n < B of the bucket and the set SM have positive best split profit){
4.    Delete a key-value pair having maximum best split profit from the set SM, wherein the bucket corresponding to the best split profit deleted thereby is b;
5.    Divide the bucket b into two sub-buckets b1 and b2 according to the optimum division position, and set $f_{b1}^- = f_{b2}^- = f_b^-$, and utilize the algorithm 1 to update the BPT index;
6.    Respectively calculate the best split profits and optimum division positions of the buckets b1 and b2;
7.    Place related information of b1 and b2 into SM;}
8. Return ;
End Algorithm Split( )

Figure 7:
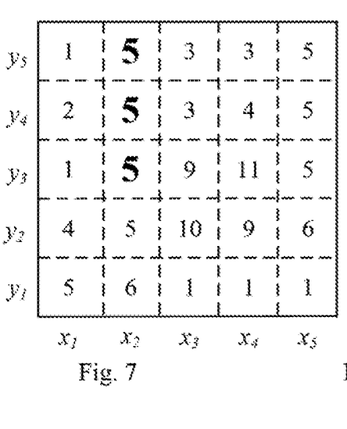
FIG. 7 is a schematic diagram illustrating data updating situations of a bucket during an RH bucket splitting process in the aggregate query method according to an embodiment of the present invention.
Figure 8:
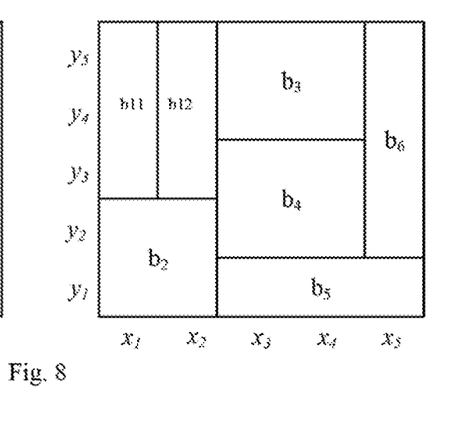
FIG. 8 is a schematic diagram of dividing a bucket after RH bucket splitting in the aggregate query method according to an embodiment of the present invention.
Figure 9:
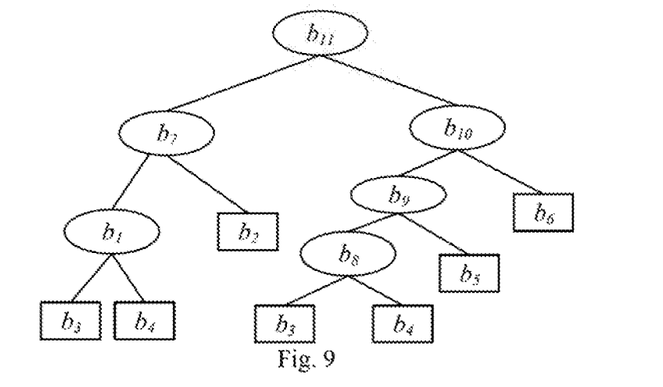
FIG. 9 is a schematic diagram of an BPT index after RH bucket splitting in the aggregate query method according to an embodiment of the present invention.
Figure 10:
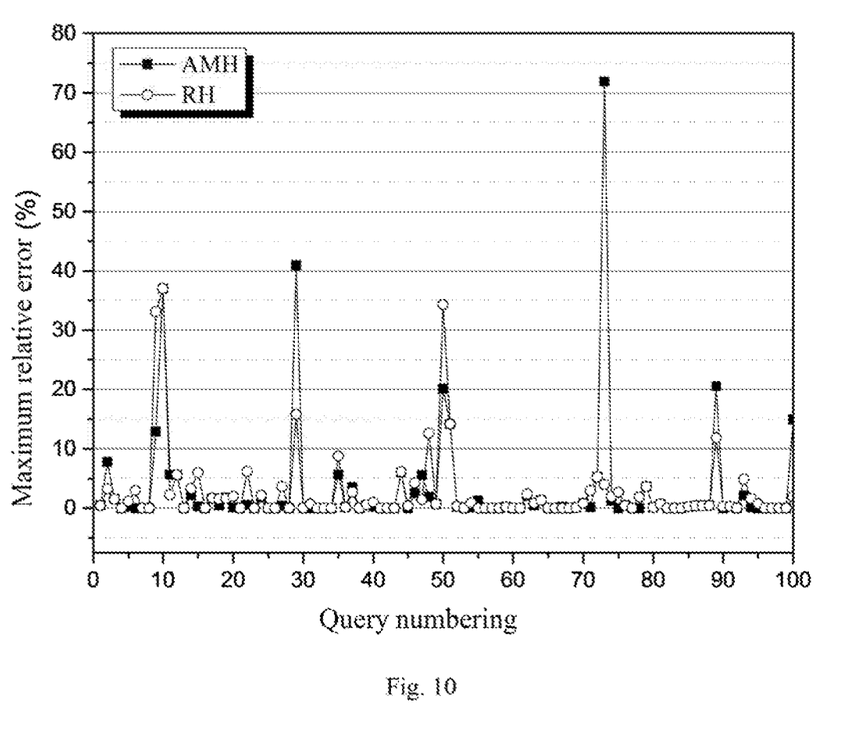
FIG. 10 is a diagram for analyzing maximum error contrast between an RH method and an AMH method in the aggregate query method according to an embodiment of the present invention.

The SortedMap( ) method is used for storing a piece of data to a Hash data SM, adding the data to the tailing of the arrival, and increasing a data length by 1;

As shown in FIG. 7, the change of cell data is represented using a larger boldfaced word (relative to FIG. 4), and $b_1$ is divided by three manners (one in an x axis, and two in a y axis), to respectively calculate the split benefits thereof, wherein a calculation formula of the split benefit SB of the division manner on the x axis is $n_1 \cdot v_1 - (n_{12} \cdot v_{12} + n_{13} \cdot v_{13})$; similarly, the split benefits of other buckets need to be calculated also (i.e., division on the y axis), and finally, the splitting with a maximum decreasing amplitude of WVS is the division on the x axis. New bucket division and binary tree are as shown in FIG. 8 and FIG. 9.

In step G, whether a bucket number in the index reaches a maximum upper limit (B) of the bucket number set by the system is judged; if yes, skip to step h; else, skip to step I.

In step H, the buckets in the index are merged, and the merge penalty (Merge Penalty, MP) of all possibly merged buckets (the bucket in the BPT needs to be a none-leaf node, and two child nodes thereof are both leaf nodes) are calculated out, then a plurality of buckets with minimum merge penalty are selected and merged into one bucket.

A calculation rule of the merge penalty is similar to the split benefit, which is to use the cell number of the bucket formed after merging to multiply by the variance, and then subtract the sum of the products of the cell numbers and variances of the two buckets before merging, for example: the leaf nodes b1 and b2 in the BPT (corresponding cells and variances are respectively: nb1, nb2 and vb1, vb2) are possibly merged into a father node b thereof (nb is the number of cells and vb is the variance), then a merge penalty calculation formula is:

$$MP = n_b \Box v_b - (n_{b1} \Box v_{b1} + n_{b2} \Box v_{b2});$$

and the method of step D is utilized to update the BPT index.

In step I, the current timestamp is judged whether to be ended, skip to step J if the current timestamp is ended; else, skip to step A. For example, the system will utilize a timestamp 08:00:00 to represent the time in a specific time region, for example, 08:00:00-08:00:09, (every 10s are represented by one timestamp); when the time of data in a data stream is 08:00:10, it represents that next timestamp arrives.

In step J, an index processing module extracts the BPT index of the current timestamp from the index storage module, generates a historical index, serializes and stores the historical index into the index storage module.

FIG. 2 shows a traffic stream aggregate query method based on Kalman filtering, an aggregate query of which includes the following steps.

In step A: a query request Q(r,ts,te) of a user is parsed, a system timestamp set $\{t_1, t_2, \ldots, t_k | t_s \le t_2 < \ldots < t_k \le t_e\}$ of a query time interval [ts,te] is extracted, and the timestamps are placed in the set into a stack T, wherein: r represents a query region, is represents a starting time, and to represents an ending time; and t1 . . . tk represent 1-K timestamps between the starting time and the ending time.

In step B: an aggregate query value AR=0 is set.

In step C, aggregate query is performed for each timestamp in T, for example, specific sub-steps are as follows:

In step C-1, the BPT is traversed to find all buckets b intersected with the query region r in space, the intersected area Sintr of r and the buckets b is calculated, and the buckets are placed into a stack S by means of <b, Sintr>.

In step C-2, for each bucket in S, an aggregate value thereof is calculated.

If the bucket b satisfies conditions: $v_b \le (f_b - f_b^-)^2$, then $AR += f_b \cdot S_{intr} \cdot \omega^2$, ($\omega$ is a resolution, and $\omega^2$ is a "square of the resolution").

Otherwise, $AR += [f_b^- + Kg_b)(f_b - f_b^-)] \cdot S_{intr} \cdot \omega^2$.

In step D, the aggregate query value AR is returned, and the query is ended.

A spatial aggregate query with respect to a single timestamp is as shown in the algorithm 3 in the table below; for each bucket b intersected with the query region 4: firstly, an area $S_{intr}$ of an intersected region of the bucket b and the query region r is calculated; then, the bucket b needs to be detected whether to satisfy a preset condition (i.e., whether to satisfy the formula (14)), so that corresponding processing (refer to the algorithm listed below) is performed, to obtain corresponding intermediate results $f_b \cdot S_{intr} \cdot \omega^2$; and finally, all the intermediate results are accumulated to obtain a spatial aggregate query value of the single timestamp. Query results of a plurality of timestamps are an accumulation of the query result of the single timestamp.

Algorithm 3 Spatial Aggregate Query of Single Timestamp

Algorithm3 Query( )

1. Traverse the BPT to find out buckets b interacted with the query region according to the query region conditions, and place these buckets into a stack S by means of <b, $S_{int}$> ;
2. Set an aggregate result AR=0.0;
3. While (the stack S is not null){
4.    <b, $S_{intr}$> = S.pop( );
5.    If( the bucket satisfies conditions: $v_b \le (f_b - f_b^-)^2$ )
6.       AR+ = $f_b \cdot S_{intr} \cdot \omega^2$ ;
7.    else
8.       AR+ = $[f_b^- + Kg_b(f_b - f_b^-)] \cdot S_{intr} \cdot \omega^2$ ;
9.    }
10. Return AR;
End Algorithm Query( )

The present invention can be implemented using a computer. In the embodiment, data collected by Ningbo Public Traffic Network was selected for experiment (a data volume includes one million pieces), and a data stream format was <T, LOC, OID>, i.e., <time, location information and vehicle identity), and vehicle information (the time interval was 10s) of 10 moments were recorded. In order to contrast and analyze the effects of the present invention for suppressing the maximum relative error, we performed contrastive analysis (the method according to the present invention is recorded as RH) with a classic traffic stream aggregate query method AMH.

We performed aggregate query on RH and AMH for 100 times respectively (the upper limit of the present inventions of RH and AMH were that B=350 and r=12, and a queried time interval included three timestamps). Experimental results were as shown in FIG. 6, wherein an maximum relative error of AMH was 71.875%, an average relative error was 3.028%, and an average value of the top five maximum relative errors was 38.067%. (The top five maximum errors were respectively 71.875%, 40.946%, 36.975%, 20.557% and 20.000% in a descending order, and there were totally five abnormal points). A maximum relative error of RH was 36.957%, an average relative error was 2.461%, and an average value of the top five maximum relative errors was 26.853%. (The top five maximum errors were respectively 36.975%, 34.247%, 33.083%, 15.788% and 14.189% in a descending order, and there were totally three abnormal points). It is not difficult to find that RH has apparent advantages on the aspect of suppressing the abnormal points so as to reduce the maximum relative error while being compared with AMH.

In conclusion, the traffic data stream aggregate query system and method based on Kalman filtering related to in the present invention solve the problem that the existing aggregate query method ignores the maximum relative error, and improves the availability of the aggregated query method.

Those skilled in the art will understand that the present invention may relate to an apparatus for performing one or more of the operations described herein in this application. This apparatus may be specially designed and constructed for the required purposes, or it may include a known apparatus in a general-purpose computer selectively activated or reconfigured by a program stored in the computer. Such a computer program may be stored in an apparatus (e.g. a computer) readable storage medium or stored in any type of media suitable for storing electronic instructions and each coupled to a bus, including but not limited to, any type of disk (including a floppy disk, a hard disk, an optical disk, a CD-ROM, and a magnetic-optical disk), a random access memory (RAM), a read-only memory (ROM), an electrically erasable ROM (EPROM), an electrically erasable programmable ROM (EEPROM), a flash memory, a magnetic or optical card. The readable medium includes any mechanism for storing or transmitting information in a form readable by an apparatus (e.g., a computer). For example, the readable medium includes a random access memory (RAM), a read-only memory (ROM), a magnetic disk storage medium, an optical storage medium, a flash-memory device, electrical, optical, acoustical or other form of propagated signals (e.g., carrier waves, infrared signals, digital signals, etc.), or the like.

Those skilled in the art will understand that each block of the structural drawings and/or block diagrams and/or flowcharts, and combinations of blocks in the structural drawings and/or block diagrams and/or flowcharts, can be implemented by computer program instructions. These computer program instructions may be provided to a processor of a general-purpose computer, a special-purpose computer, or other programmable data processing method to produce a machine, such that the instructions, which execute via the processor of the computer or other programmable data processing method, create a method for implementing the blocks or a plurality of blocks specified in the structural drawings and/or block diagrams and/or flowcharts.

Those skilled in the art will understand that alternations, modifications, combinations or removals may be made to the steps, measures an solutions in various operations, methods and flows discussed in the present invention. Further, alternations, modifications, rearrangement, resolution, combinations or removals may also be made to other steps, measures and solutions in various operations, methods and flows discussed in the present invention. Further, alternations, modifications, rearrangement, resolution, combinations or removals may also be made to steps, measures and solutions in various operations, methods and flows possessed in the prior art and discussed in the present invention.

The above only describes partial implementations of the present invention. It should be pointed out that, those having ordinary skill in the art may figure out a plurality of improvements and polishing without departing from the principle of the present invention which shall all be deemed as the protection scope of the present invention.

The invention claimed is:

1. A traffic data stream aggregate query computer-implemented method, comprising the following steps of:
    collecting mobile object information, and converting the mobile object information into a computer-processible data form to process a data stream when a system timestamp is determined;
    generating and updating an index file when the system timestamp is determined;
    performing a traffic data stream electronic query on a spatial region r according to a query request SUM(r, ts,te) while generating and updating the index file, extracting a system timestamp of a query time interval [ts,te], and performing spatial aggregate query on each timestamp, wherein performing the spatial aggregate query on each timestamp includes: traversing an index file of the current timestamp, and retrieving aggregate query values of the spatial region in each bucket under the current timestamp using a following expression:

$$SUM = \begin{cases} f_{bi} S_{intr} \omega^2, & v_{bi} \leq (f_{bi} - f_{bi}^-)^2 \\ [f_{bi}^- + K g_{bi}(f_{bi} - f_{bi}^-)] S_{intr} \omega^2, & v_{bi} > (f_{bi} - f_{bi}^-)^2 \end{cases},$$

SUM being an aggregate query value of the spatial region r at a $(bi)^{th}$ bucket, $S_{intr}$ that includes an area of an interacted region of the spatial region r and the $(bi)^{th}$ bucket, $f_{bi}$ that includes an average frequency of the $(bi)^{th}$ bucket at the current timestamp, $f_{bi}^-$ that includes an average frequency of $(bi)^{th}$ bucket at a previous timestamp $t^-$, and $v_{bi}$ that includes a variance of the $(bi)^{th}$ bucket;
    processing a summation of the query values of each timestamp to form a final aggregate query value;
    determining that the variance of the $(bi)^{th}$ bucket is below a preset threshold; and
    performing optimal estimation processing using a Kalman filtering principle to suppress a maximum relative error of anomaly points to improve an availability of the final aggregate query value.

2. The traffic data stream aggregate query computer-implemented method according to claim 1 further including, initializing an index file generated by a data stream of a first system timestamp: adopting a reasonable histogram to divide data space into $\omega \square \omega$ cells, using a mobile object number within the cell in the current timestamp as a frequency of the cell, then grouping the adjacent cells with similar frequency into one bucket, and forming n buckets, $0 < n \leq B$, $\omega$ being a $\omega$, and B being an upper limit of the bucket number, wherein for each bucket the average frequency of all the cells is used in the bucket as a frequency of the bucket to calculate an average value of an average frequency variance of each cell in the bucket, and a variance and a Kalman gain of the bucket;

using the Kalman filtering principle to update the index file when a next system timestamp is determined:

determining when data in a $c^{th}$ cell changes, recording a data variance as d, and updating a frequency $F_c$ of the $c^{th}$ cell: $F_c^- = F_c$, $F_c = F_c + d$, wherein: $F_c^-$ is a frequency of the $c^{th}$ cell in a previous timestamp, $1 \leq c \leq \omega^2$, and d is any real number;

traversing the index file of the current timestamp to find buckets containing the cells with changed data volumes, for a $b^{th}$ bucket, the $b^{th}$ bucket containing $n_b$ cells, $b < n$, and $n_b < \omega \square \omega$:

updating a frequency of the $b^{th}$ bucket: $f_b = f_b^- + d$, $\Delta g = f_b^2 - f_b^{-2}$, updating an average value and a variance of per square of frequency of each cell in the $b^{th}$ bucket: $g_b = (n_b \cdot g_b^- + \Delta g)/n_b$, $v_b = g_b - f_b^2$, updating a Kalman gain of an $i^{th}$ cell in the $b^{th}$ bucket, $F_i$ being a frequency of the $i^{th}$ cell, wherein updating the Kalman gain occurs when $F_i > f_b$, the Kalman gain of the $i^{th}$ cell being:

$$Kg_i^+ = \frac{f_b + \sqrt{v_b} - f_b^-}{f_b - f_b^-},$$

when $F_i f_b$, the Kalman gain of the $i^{th}$ cell being:

$$Kg_i^- = \frac{f_b - \sqrt{v_b} - f_b^-}{f_b - f_b^-},$$

calculating out the number $n_{b1}$ of cells with a frequency greater than the average frequency in the $b^{th}$ bucket, and updating the Kalman gain of the $b^{th}$ bucket: $Kg_b = n_{b1} \square Kg_i^+ + (n_b - n_{b1}) \square Kg_i^-$, and $1 \leq i \leq n_{b1} \leq n_b$;

determining each bucket needing to be split and calculating a best split profit and an optimum division position of each bucket needing to be split, dividing the bucket needing to be split into two sub-buckets and setting both frequencies of the two sub-buckets in the previous system timestamp be equal to that of the bucket before splitting, then repeating the updating of the frequency $F_c$ of the $c^{th}$ cell: $F_c^- = F_c$, $F_c = F_c + d$;

determining buckets not needing to be split, using a minimum merge penalty principle to merge a plurality of buckets with concentrated frequencies into one bucket when the bucket number in the index reaches an upper limit, and then repeating the updating of the frequency $F_c$ of the $c^{th}$ cell: $F_c^- = F_c$, $F_c = F_c + d$;

for the buckets not needing to be split, collecting the mobile object information and converting the mobile object information into a computer-processible data form to process a data stream when the system timestamp is determined and when the bucket number in the index does not reach the upper limit and the current system timestamp is not ended; and for the buckets not needing to be split, extracting an index file of the current timestamp to generate a historical index when the bucket number in the index does not reach the upper limit and the current system timestamp is ended.

3. The traffic data stream aggregate query computer-implemented method according to claim 1, wherein a binary partition tree structure is adopted when generating and updating the index file when the system timestamp is determined to index buckets.

4. A traffic data stream aggregate query system, comprising:

a memory storing instructions that are executed by a processor cause the processor to:

collect mobile object information, and convert the mobile object information into a computer-processible data form to process a data stream when a system timestamp is determined;

generate and update an index file when the system timestamp is determined;

perform a traffic data stream electronic query on a spatial region r according to a query request SUM (r,ts,te) while generating and updating the index file, extract a system timestamp of a query time interval [ts,te], and perform spatial aggregate query on each timestamp, wherein performing the spatial aggregate query on each timestamp includes: traversing an index file of the current timestamp, and retrieving aggregate query values of the spatial region in each bucket under the current timestamp using a following expression:

$$SUM = \begin{cases} f_{bi} S_{intr} \omega^2, & v_{bi} \leq (f_{bi} - f_{bi}^-)^2 \\ [f_{bi}^- + Kg_{bi}(f_{bi} - f_{bi}^-)] S_{intr} \omega^2, & v_{bi} > (f_{bi} - f_{bi}^-)^2 \end{cases},$$

SUM being an aggregate query value of the spatial region r at a $(bi)^{th}$ bucket, $S_{intr}$ that includes an area of an interacted region of the spatial region r and the $(bi)^{th}$ bucket, $f_{bi}$ that includes an average frequency of the $(bi)^{th}$ bucket at the current timestamp, $f_{bi}^-$ that includes an average frequency of $(bi)^{th}$ bucket at a previous timestamp $t^-$, and $v_{bi}$ that includes a variance of the $(bi)^{th}$ bucket;

process a summation of the query values of each timestamp to form a final aggregate query value;

determine that the variance of the $(bi)^{th}$ bucket is below a preset threshold; and perform optimal estimation processing using a Kalman filtering principle to suppress a maximum relative error of anomaly points to improve an availability of the final aggregate query value.

5. The traffic data stream aggregate query system according to claim 4, wherein a binary partition tree structure is adopted when generating and updating the index file when the system timestamp is determined to index buckets.

6. A traffic stream index creation computer-implemented method based on a Kalman filtering principle, comprising:

acquiring and preprocessing, by an information collection module, mobile object information;

analyzing by a data processing module, whether a binary partition tree index (BPT index) of a current timestamp exists in an index storage module, wherein a new BPT index of the current timestamp is electronically processed upon determining that the BPT index of the current timestamp does not exist, wherein: both Kg and f− are 0 t;

updating the BPT index based on the Kalman filtering principle;

analyzing whether a bucket in the BPT index needs to be split according to a variance of the bucket, wherein splitting is needed if the variance of the bucket is greater than a preset threshold, wherein upon determining that the splitting is needed if the variance of the bucket is greater than a preset threshold, a split benefit SB of each splitting situation in each bucket needing to be split b and a corresponding division position by exhaustive enumeration is electronically calculated, wherein a cell number and a variance of b before splitting as $n_b$ and $v_b$, are recorded and b into $b_1$ and $b_2$ are divided, wherein the corresponding cells and variances are respectively: $n_{b1}$, $n_{b2}$ and $v_{b1}$, $v_{b2}$, then the split benefit SB=$n_b \Box v_b-(N_{b1} \Box v_{b1}+n_{b2} \Box v_{b2})$, wherein the one having the maximum SB value being recorded as the best split profit (BSP), determining that the variance of the bucket is below the preset threshold;

dividing the bucket b into two sub-buckets b1 and b2 according to the BSP, and setting an initial value of $f_{b1}^-=f_{b2}^-=f_b^-$ after splitting, updating the BPT index, and calculating a corresponding Kalman gain;

analyzing whether a bucket number in the index reaches a maximum upper limit (B) of the bucket number set by the system, wherein if it is determined that the bucket number in the index reaches the maximum upper limit (B) of the bucket number set by the system, merging the buckets in the index, and calculating out merge penalty MP of all possibly merged buckets, wherein the bucket in the BPT index needs to be a none-leaf node, and two child nodes thereof are both leaf nodes, wherein a plurality of buckets are selected and merged with minimum merge penalty into one bucket;

a calculation rule of the merge penalty being similar to the split benefit, which is to use the cell number of the bucket formed after merging to multiply by the variance, and then subtract the sum of the products of the cell numbers and variances of the two buckets before merging, then a merge penalty calculation formula being: MP=$n_b \Box v_b-(n_{b1} \Box v_{b1}+n_{b2} \Box v_{b2})$, and updating the BPT index based on the Kalman filtering principle;

analyzing whether the current timestamp is ended, wherein upon determining that the current timestamps is ended, extracting, by an index processing module, the BPT index of the current timestamp from the index storage module, generating a historical index, serializing and storing the historical index upon the index storage module;

performing an aggregate query for each timestamp, wherein with respect to a spatial aggregate query of a single timestamp, for each bucket intersected with a query region r: calculating an intersected area of an intersected region of the bucket and the query region r then, calculating intermediate results of the bucket and accumulating all the intermediate results to obtain a spatial aggregate query value of the single timestamp, wherein query results of a plurality of timestamps include an accumulation of the query result of the single timestamp; and performing optimal estimation processing using the Kalman filtering to suppress a maximum relative error of anomaly points to improve an availability of the spatial aggregate query value.

7. The traffic stream index creation computer-implemented method according to claim 6, wherein acquiring and preprocessing the mobile object information further comprises:

acquiring, by the information collection module, a mobile object signal, and converting the signal into a data stream form; and sending, by the information collection module, to the data processing module when one system timestamp is determined.

8. The traffic stream index creation computer-implemented method according to claim 6, wherein updating the BPT index based on the Kalman filtering principle further comprises:

for each changed cell c, calculating a variance d thereof and updating frequency information thereof: $F_c^-=F_c$, $F_c=F_c+d$, wherein $F_c^-$ represents a frequency of a previous timestamp;

for each changed cell c, traversing the BPT index to find a bucket b containing the changed cell, and updating a frequency and a Kalman gain of the bucket b: $f_b^-=f_b$, $f_b=f_b+d$, $\Delta g=f_b^2-f_b^{-2}$, and $g_b=(n_b \cdot g_{b+}\Delta g)/n_b$, $v_b=g_b-f_b^2$; and analyzing a number of cells having a frequency greater than the mean frequency in the bucket, and calculating a Kalman gain of the bucket: $Kg_b=n_{b1} \Box Kg^+ +(n_b+n_{b1}) \Box Kg^-$.

9. A traffic stream aggregate query computer-implemented method based on Kalman filtering, comprising:

parsing a query request Q(r,ts,te) of a user, extracting a system timestamp set $\{t_1,t_2,\ldots,t_k | t_s \le t_1 < t_2 < \ldots < t_k \le t_e\}$ of a query time interval [ts,te], and placing the timestamps in the set into a stack T, wherein r represents a query region, ts represents a starting time, and te represents an ending time, wherein t1 ... tk represent 1-K timestamps between the starting time and the ending time;

setting an aggregate query value AR=0;

performing aggregate query for each timestamp in T, wherein with respect to the spatial aggregate query of a single timestamp, for each bucket b intersected with a query region r: calculating an intersected area ($S_{intr}$) of an intersected region of the bucket b and the query region r then, calculating intermediate results $f_b \cdot S_{intr} \cdot \omega^2$ of the bucket b and accumulating all the intermediate results to obtain a spatial aggregate query value of the single timestamp, wherein query results of a plurality of timestamps include an accumulation of the query result of the single timestamp;

returning the aggregate query value AR, and ending query; and performing optimal estimation processing using the Kalman filtering to suppress a maximum relative error of anomaly points to improve an availability of the aggregate query value AR.

10. The traffic stream aggregate query computer-implemented method according to claim 9, wherein performing the aggregate query for each timestamp in T comprises:

traversing the BPT to find all buckets b intersected with the query region r in space, calculating the intersected area $S_{intr}$ of r and the buckets b, and placing the buckets into a stack S by means of <b, $S_{intr}$>; and for each bucket in S, calculating an aggregate value thereof;

if the bucket b satisfies conditions: $v_b \leq (f_b - f_b^-)^2$, then $AR += f_b \cdot S_{intr} \cdot \omega^2$, wherein: $\omega$ is a resolution, and $\omega^2$ is a square of the resolution, else, $AR += [f_b^- + Kg_b(f_b - f_b^-)] \cdot S_{intr} \omega^{\cdot 2}$.

* * * * *